(12) United States Patent
Boose et al.

(10) Patent No.: US 7,982,736 B2
(45) Date of Patent: Jul. 19, 2011

(54) METHOD AND APPARATUS FOR IDENTIFYING DIFFERENCES IN VECTOR GRAPHIC FILES

(75) Inventors: Molly L. Boose, Bellevue, WA (US); Lawrence S. Baum, Bellevue, WA (US)

(73) Assignee: The Boeing Company, Chicago, IL (US)

( * ) Notice: Subject to any disclaimer, the term of this patent is extended or adjusted under 35 U.S.C. 154(b) by 1000 days.

(21) Appl. No.: 11/843,352

(22) Filed: Aug. 22, 2007

(65) Prior Publication Data

US 2009/0051698 A1    Feb. 26, 2009

(51) Int. Cl.
*G06T 11/20* (2006.01)
*G06T 1/00* (2006.01)
*G06T 1/60* (2006.01)

(52) U.S. Cl. ............ 345/441; 345/418; 345/530

(58) Field of Classification Search ........... 345/418, 345/423, 441, 530; 382/242, 305

See application file for complete search history.

(56) References Cited

U.S. PATENT DOCUMENTS

| 5,822,503 | A  | * | 10/1998 | Gass et al. ............ 358/1.9 |
| 2003/0197714 | A1 | * | 10/2003 | Boose et al. .......... 345/619 |
| 2004/0041818 | A1 | * | 3/2004 | White et al. .......... 345/619 |
| 2005/0213753 | A1 | * | 9/2005 | Aoki .................. 380/30 |

OTHER PUBLICATIONS

Woolsey et al., "Strategies in Re-Purposing Graphics for Interactive Intelligent Delivery", XML Europe 2001, May 2001, pp. 1-20, Internationales Congress Centrum, Berlin Germany.

* cited by examiner

*Primary Examiner* — Joni Hsu
(74) *Attorney, Agent, or Firm* — Yee & Associates, P.C.

(57) ABSTRACT

A computer implemented method, apparatus, and computer usable program code for identifying differences in vector graphics files. A set of vector graphics file pairs are retrieved, wherein each vector graphics file pair in the set includes a first vector graphics file and a second vector graphics file. The first vector graphics file is compared with the second vector graphics file in each vector graphics file pair in the set using a one or more rules to form one or more comparisons. Differences are identified between the first and second vector graphics file in each vector graphics file pair in the set based on the comparisons. A merged file is created for each vector graphics file pair in the set containing differences from the comparisons to form results. The results are displayed in a graphical user interface after creating the merged file.

19 Claims, 8 Drawing Sheets

METHOD AND APPARATUS FOR IDENTIFYING DIFFERENCES IN VECTOR GRAPHIC FILES

BACKGROUND INFORMATION

1. Field

The present disclosure relates generally to an improved data processing system and in particular to a method and apparatus for processing data. Still more particularly, the present disclosure relates to a computer implemented method, apparatus, and computer usable program code for processing vector graphic files.

2. Background

In the area of aerospace and defense, product life cycles may span up to thirty years. Many thousands of files contain graphic representations of data for different products and are currently in a vector graphics format. Vector graphics involves the use of geometrical primitives such as points, lines, curves, and polygons to represent images. A primitive is the simplest default geometrical figure or shape.

Initiatives are present in aerospace and defense industries to create electronic drawings that contain intelligent graphics. Intelligent graphics associate text data and graphics data in a manner that increases user understanding. Text data may present precise detailed information, that sequential and special information may be more easily understood by the graphics. Intelligent graphics may be used to enhance the graphic content in various electronic technical manuals and in automated generation of illustrations and updates.

For example, the usability of drawings in wiring manuals for an aircraft is currently very low with currently available diagrams. By adding intelligent functions to drawings, such as lighted wiring runs and direct links to and from wiring lists, the usability of these types of manuals are increased.

Intelligent graphics files use intelligent graphics objects within the different illustrations for different products. For example, a drawing in the form of a schematic diagram for a hydraulics system may include intelligent graphics objects that may show valve movement and fluid flow in which the flow may be visualized from the schematic when the user selects certain components. In these examples, the intelligent graphics objects are used in conjunction with vector graphics data for the hydraulics system. The vector graphics data provide the static illustration of the hydraulics system. The intelligent graphics objects add animation, color, or other information used to show the valve movement and fluid flow in this system.

Further, the flow may be shown across different diagrams. In a similar fashion, signal paths may be shown across various wiring diagrams. In other examples, intelligent graphics objects may be added to provide links from illustrated components to information on supplier part numbers, ordering tools, or animated sequences may be provided through intelligent graphics.

In creating drawings with intelligent graphic objects, it is desirable to reuse currently existing vector graphics files and add intelligent objects to those files. Although new programs are being developed that allow for the embedding of intelligent graphic objects to provide intelligent graphics for various drawings, large amounts of legacy graphics files are present. These legacy graphics files may include vector graphics files and master graphics files.

Importing vector graphics files and adding intelligent objects may be automated. In importing these files, however, it is important to ensure that the import process does not change the vector graphics data for the drawing in any unintended manner. Currently, the legacy vector graphics files are compared by hand. This type of method is labor intensive and error prone. Often times, every drawing cannot be compared and only spot checks are made.

Furthermore, the need to compare versions of vector files also exists outside the realm of intelligent graphics. Whenever a new release of drawings for a product occurs, it is important to ensure that only intended changes have been applied to those drawings that should have changed and that the remainder of the drawings have not changed at all.

Another relevant situation involves a new release of illustration software that exports data in the form of vector graphics. In this situation, it is important to ensure that, for existing data, the new export filter in the new release generates vector files that are correct when compared against the output of the previous filter used in an older version of the illustrating software.

Thus, it would be advantageous to have an improved computer implemented method, apparatus, and computer usable program code for avoiding issues as described above.

SUMMARY

The advantageous embodiments provide a computer implemented method, apparatus, and computer usable program code for identifying differences in vector graphics files. A set of vector graphics file pairs are retrieved, wherein each vector graphics file pair in the set of vector graphics file pairs includes a first vector graphics file and a second vector graphics file. The first vector graphics file is compared with the second vector graphics file in each vector graphics file pair in the set of vector graphics file pairs using a set of rules to form a set of comparisons. Differences are identified between the first vector graphics file and the second vector graphics file in each vector graphics file pair in the set of vector graphics file pairs based on the set of comparisons. A merged file is created for each vector graphics file pair in the set of vector graphics file pairs containing differences from the set of comparisons to form results. The results are displayed in a graphical user interface after creating the merged file.

In another advantageous embodiment, a computer implemented method identifies differences in vector graphics files. A configuration file is identified. The configuration file provides a location of a first vector graphics file and a second vector graphics file and a set of rules. The first vector graphics file and the second vector graphics file are retrieved using the location in the configuration file, wherein the first vector graphics file comprises a first plurality of primitives and the second vector graphics file comprises a second plurality of primitives. The first plurality of primitives is placed from the first vector graphics file into a first layer in a merged file. The second plurality of primitives is placed from the second vector graphics file into a second layer in the merged file. The first plurality of primitives is added to a list in association with the first vector graphics file. The second plurality of primitives is compared in the second vector graphics file to primitives on the list to form a comparison. Responsive to a match between a primitive in the second plurality of primitives and a corresponding primitive on the list, the corresponding primitive on the list is marked as being associated with the second vector graphics file. Responsive to any primitive on the list being associated only with a single vector graphics file, the any primitive is placed in a third layer. A set of layers identified from the first layer, the second layer, and the third layer in the merged file is displayed in a selected order.

In yet another advantageous embodiment of the present invention, a computer program product contains a computer usable medium to identify differences in vector graphics files. The computer program product includes computer usable program code to identify a configuration file, wherein the configuration file provides a location of a first vector graphics file and a second vector graphics file and a set of rules. Computer usable program code is present to retrieve the first vector graphics file and the second vector graphics file using the location in the configuration file, wherein the first vector graphics file comprises a first plurality of primitives and the second vector graphics file comprises a second plurality of primitives. The computer program product includes computer usable program code to place the first plurality of primitives from the first vector graphics file into a first layer in a merged file. The computer usable program code places the second plurality of primitives from the second vector graphics file into a second layer in the merged file. The computer usable program code is present to add the first plurality of primitives to a list in association with the first vector graphics file. The computer usable program code is present to compare the second plurality of primitives in the second vector graphics file to primitives on the list to form a comparison. The computer program product has computer usable program code, responsive to a match between a primitive in the second plurality of primitives and a corresponding primitive on the list, to mark the corresponding primitive on the list as being associated with the second vector graphics file. Computer usable program code is present that places the any primitive in a third layer in response to any primitive on the list being associated only with a single vector graphics file. Computer usable program code is present to display a set of layers identified from the first layer, the second layer, and the third layer in the merged file in a selected order.

In yet another advantageous embodiment, a data processing a bus; a communications unit connected to the bus; a storage device connected to the bus, wherein the storage device includes computer usable program code; and a processor unit connected to the bus. The processor unit executes the computer usable program to identify a configuration file, wherein the configuration file provides a location of a first vector graphics file and a second vector graphics file and a set of rules; retrieve the first vector graphics file and the second vector graphics file using the location in the configuration file, wherein the first vector graphics file comprises a first plurality of primitives and the second vector graphics file comprises a second plurality of primitives; place the first plurality of primitives from the first vector graphics file into a first layer in a merged file; place the second plurality of primitives from the second vector graphics file into a second layer in the merged file; add the first plurality of primitives to a list in association with the first vector graphics file; compare the second plurality of primitives in the second vector graphics file to primitives on the list to form a comparison; mark a corresponding primitive on the list as being associated with the second vector graphics file in response to a match between a primitive in the second plurality of primitives the corresponding primitive on the list; place the any primitive in a third layer in response to any primitive on the list being associated only with a single vector graphics file; and display a set of layers identified from the first layer, the second layer, and the third layer in the merged file in a selected order.

The features, functions, and advantages can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an advantageous embodiment of the present disclosure when read in conjunction with the accompanying drawings, wherein:

DETAILED DESCRIPTION

Figure 1:
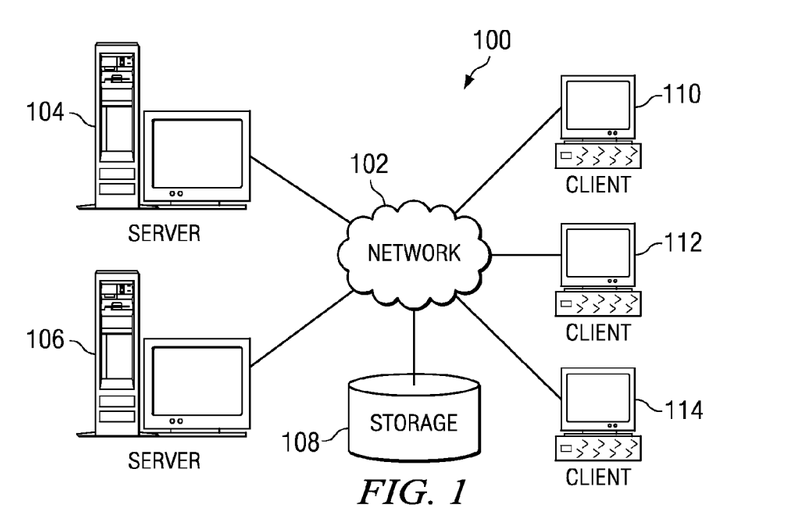
FIG. 1 is a pictorial representation of a network of data processing systems in which an advantageous embodiment may be implemented.
Figure 2:
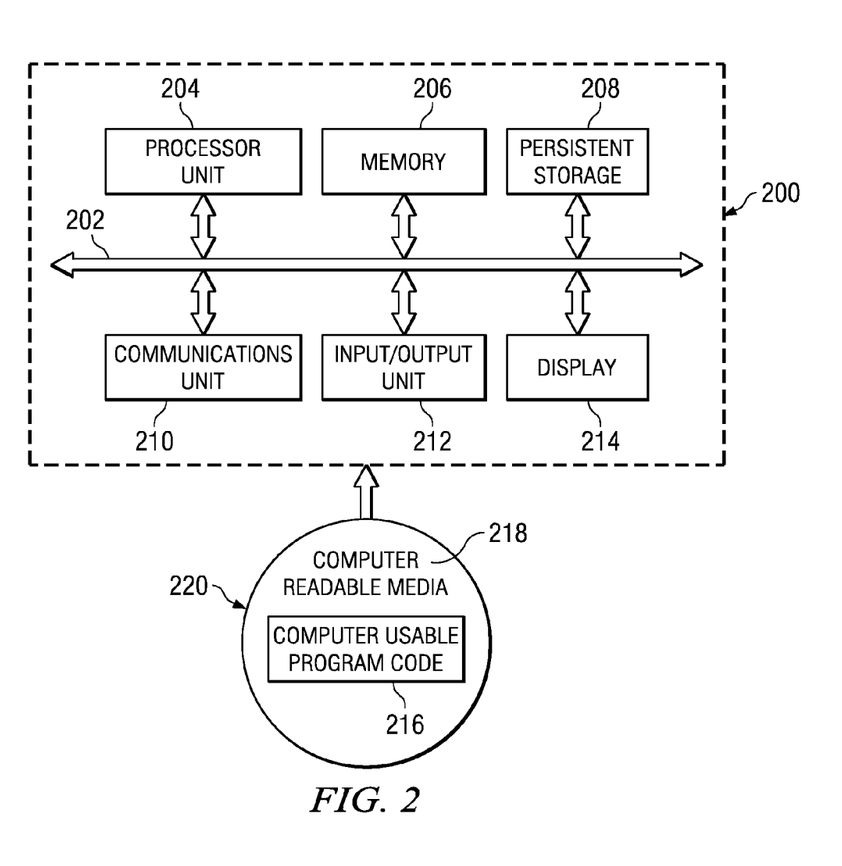
FIG. 2 is a block diagram of a data processing system in accordance with an advantageous embodiment.

With reference now to the figures, and in particular with reference to FIGS. 1-2, exemplary diagrams of data processing environments are provided in which illustrative embodiments may be implemented. It should be appreciated that FIGS. 1-2 are only exemplary and are not intended to assert or imply any limitation with regard to the environments in which different embodiments may be implemented. Many modifications to the depicted environments may be made.

FIG. 1 depicts a pictorial representation of a network of data processing systems in which illustrative embodiments may be implemented. Network data processing system 100 is a network of computers in which the illustrative embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server 104 and server 106 connect to network 102 along with storage unit 108. In addition, clients 110, 112, and 114 connect to network 102. Clients 110, 112, and 114 may be, for example, personal computers or network computers. In the depicted example, server 104 provides data, such as boot files, operating system images, and applications to clients 110, 112, and 114. Clients 110, 112, and 114 are clients to server 104 in this example. Network data processing system 100 may include additional servers, clients, and other devices not shown.

In these examples, vector graphics files may be found on different data processing systems, such as server 104, storage 108, and client 114. Some of these vector graphics files may also include intelligent graphics objects to provide intelligent graphics functions for some of the vector graphics files. Other vector graphics files may contain only vector graphics data. In addition, within network data processing system 100, vector graphics files containing only vector graphics data may be transformed into vector graphics files with intelligent graphics features.

The different advantageous embodiments provide a computer implemented method, apparatus, and computer usable program code for comparing vector graphics files in their original form with only vector graphics data and vector graphics files containing vector graphics data and intelligent objects. The different advantageous embodiments provide an ability to identify whether differences have occurred in converting an original vector graphics file into a new vector graphics file with intelligent graphics features.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the different illustrative embodiments.

With reference now to FIG. 2, a block diagram of a data processing system is shown in which illustrative embodiments may be implemented. Data processing system 200 is an example of a computer, such as server 104 or client 110 in FIG. 1, in which computer usable program code or instructions implementing the processes may be located for the illustrative embodiments.

In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software that may be loaded into memory 206. Processor unit 204 may be a set of one or more processors or may be a multi-processor core, depending on the particular implementation. Further, processor unit 204 may be implemented using one or more heterogeneous processor systems in which a main processor is present with secondary processors on a single chip. As another illustrative example, processor unit 204 may be a symmetric multi-processor system containing multiple processors of the same type.

Memory 206, in these examples, may be, for example, a random access memory. Persistent storage 208 may take various forms depending on the particular implementation. For example, persistent storage 208 may contain one or more components or devices. For example, persistent storage 208 may be a hard drive, a flash memory, a rewritable optical disk, a rewritable magnetic tape, or some combination of the above. The media used by persistent storage 208 also may be removable. For example, a removable hard drive may be used for persistent storage 208.

Communications unit 210, in these examples, provides for communications with other data processing systems or devices. In these examples, communications unit 210 is a network interface card. Communications unit 210 may provide communications through the use of either or both physical and wireless communications links.

Input/output unit 212 allows for input and output of data with other devices that may be connected to data processing system 200. For example, input/output unit 212 may provide a connection for user input through a keyboard and mouse. Further, input/output unit 212 may send output to a printer. Display 214 provides a mechanism to display information to a user.

Instructions for the operating system and applications or programs are located on persistent storage 208. These instructions may be loaded into memory 206 for execution by processor unit 204. The processes of the different embodiments may be performed by processor unit 204 using computer implemented instructions, which may be located in a memory, such as memory 206. These instructions are referred to as computer usable program code or computer readable program code that may be read and executed by a processor in processor unit 204. The computer readable program code may be embodied on different physical or tangible computer readable media, such as memory 206 or persistent storage 208.

Computer usable program code 216 is located in a functional form on computer readable media 218 and may be loaded onto or transferred to data processing system 200. Computer usable program code 216 and computer readable media 218 form computer program product 220 in these examples. In one example, computer readable media 218 may be, for example, an optical or magnetic disc that is inserted or placed into a drive or other device that is part of persistent storage 208 for transfer onto a storage device, such as a hard drive that is part of persistent storage 208. Computer readable media 218 also may take the form of a persistent storage, such as a hard drive or a flash memory that is connected to data processing system 200.

Alternatively, computer usable program code 216 may be transferred to data processing system 200 from computer readable media 218 through a communications link to communications unit 210 and/or through a connection to input/output unit 212. The communications link and/or the connection may be physical or wireless in the illustrative examples. The computer readable media also may take the form of non-tangible media, such as communications links or wireless transmissions containing the computer readable program code.

The different components illustrated for data processing system 200 are not meant to provide architectural limitations to the manner in which different embodiments may be implemented. The different illustrative embodiments may be implemented in a data processing system including components in addition to or in place of those illustrated for data processing system 200. Other components shown in FIG. 2 can be varied from the illustrative examples shown.

For example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

The different advantageous embodiments recognize that the current systems used to compare an original vector graphics file with a modified vector graphics file is tedious and time consuming. Further, when thousands or hundreds of thousands of drawings are present for different manuals in schematics for different aircraft, the current systems are unable to compare every single drawing. The different advantageous embodiments provide a computer implemented method, apparatus, and computer usable program code for comparing vector graphics files. Further, the different advantageous embodiments also provide an ability to more easily and quickly identify the differences that are present when differences are found between vector graphics files.

Thus, the illustrative embodiments provide a computer implemented method, apparatus, and computer usable program code for identifying differences in vector graphics files. The process retrieves a set of vector graphics file pairs in which each vector graphics file pair in the set of vector graphics file pairs includes a first vector graphics file and a second vector graphics file. The set of vector graphics file pairs include one or more pairs of vector graphics files. The first vector graphics file is compared with the second vector graphics file in each vector graphics file pair using a set of rules to form a set of comparisons. Differences between the first vector graphics file and the second vector graphics file in each vector graphics file pair is identified based on the set of comparisons. A merged file is created for each vector graphics file pair containing differences from the set of comparisons. The results are then selectively displayed in a graphical user interface after creating the merged file for each vector graphics file pair containing differences.

Figure 3:
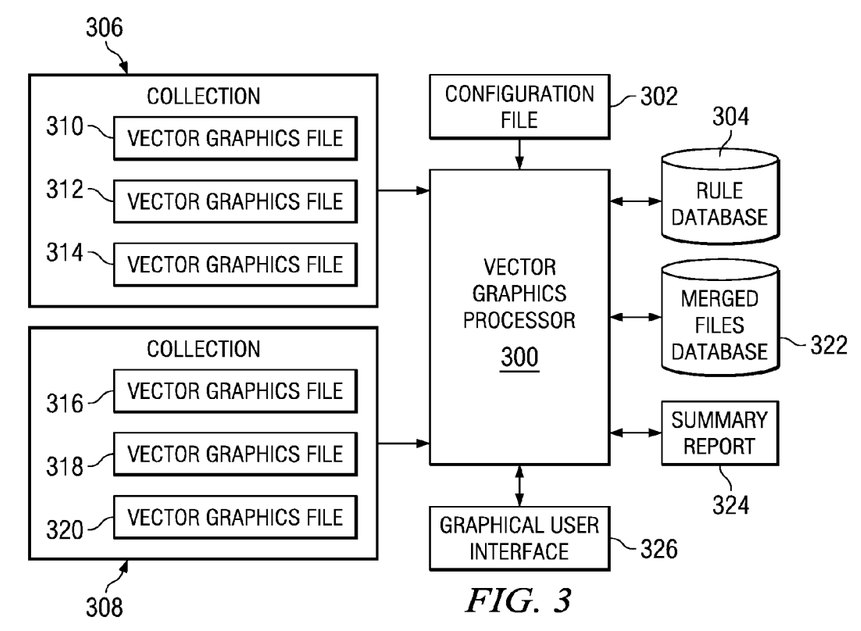
FIG. 3 is a diagram illustrating components used to find differences in vector graphics files in accordance with an advantageous embodiment.

With reference now to FIG. 3, a diagram illustrating components used to find differences in vector graphics files is depicted in accordance with an advantageous embodiment. In the illustrative example, vector graphics processor 300 may compare input vector graphics files to find differences between vector graphics files. Vector graphics processor 300 parses configuration file 302 to identify a pair of vector graphics files for processing.

Configuration file 302 may contain an identification of multiple files for comparison. The identification may be through a list of files as well as the path or location of the files. Further, configuration file 302 may identify rules for use in performing the comparison. These rules may be located within configuration file 302. Alternatively, configuration file 302 may identify rules in rule database 304 for use in comparing vector graphics files.

In these examples, a vector graphics file is any file that contains vector graphics data. For example, a file containing vector graphics data for a drawing and intelligent objects is a vector graphics file. A computer aided design file with vector graphics data is another example of a vector graphics file. In other words, a vector graphics file does not have to only contain vector graphics data.

In these examples, configuration file 302 may identify collection 306 and collection 308 as collections of vector graphics files for comparison. Collection 306 contains vector graphics files 310, 312, and 314. Collection 308 contains vector graphics files 316, 318, and 320. In this particular example, configuration file 302 may specify a comparison between vector graphics files 310 and 316; a comparison between vector graphics files 312 and 318; and a comparison between vector graphics files 314 and 320.

In these illustrative examples, the vector graphics files in collection 306 may be original files, while collection 308 contains modified or processed versions of the vector graphics files in collection 306. For example, vector graphics file 316 may be an imported or processed version of vector graphics file 310 to include intelligent objects. Alternatively, vector graphics file 316 may be a version of vector graphics file 310 imported for use by a particular program without any intent to add or change information. A vector graphics file may contain vector graphics data for one or more drawings.

Using configuration file 302, vector graphics processor 300 obtains vector graphics file 310 and vector graphics file 316 and performs a comparison between the vector graphics data for drawings in each of the files. This comparison may be made by, for example, comparing primitives and attributes associated with primitives in the two vector graphics files, to determine whether differences are present. These attributes may include, for example, line width, color, font size, spacing, and location. Further, the comparison also may include comparing other information in the vector graphics file.

A set of rules identified in configuration file 302 defines the manner in which comparisons are made. For example, the set of rules may state certain types of primitives or attributes for the primitives are to be ignored in the comparison.

During the comparison process, in these examples, vector graphics processor 300 generates a list of elements or primitives located in vector graphics file 310. This list may take the form of any type of data structure. For example, the list may be a table, a flat file, or even a database.

Additionally, vector graphics processor 300 copies the primitives into a layer within a merged file in merged files database 322. The primitives from vector graphics file 316 are also copied into a second layer within the same merged file within merged files database 322. In the depicted example, each of these primitives from vector graphics file 316 is compared with the primitives on the list. The primitives on the list are associated with vector graphics file 310. This association may be made by a mark or some indicator being added to the list.

Each primitive in vector graphics file 316 is compared to the primitive or elements in the list. If the primitive is found, the primitive is also associated with vector graphics file 316. If the primitive is not on the list, the primitive is added to the list and associated with vector graphics file 316. In this manner, the list provides a listing of differences that may be present between vector graphics file 310 and vector graphics file 316. If differences are found, these primitives are stored in a third layer within the merged file.

Further, after all of the primitives in vector graphics file 316 have been compared with the list, any primitives in the list that are only associated with the first vector graphics file and not the second vector graphics file are placed into the third layer. This third layer contains all of the differences in the drawing that have been identified from the comparison.

This merged file is then stored in merged files database 322. If differences are not present, then the merged file is discarded and not stored, in these examples. Further, the list generated by vector graphics file 300 may form summary report 324 in these examples.

As a result of the comparison process, any differences identified by vector graphics processor 300 are stored in a merged file in merged files database 322, in these examples.

Each file in merged files database 322 contains data from the original vector graphics files as well as information identifying the difference between the two compared vector graphics files. This type of comparison process is performed for each of the vector graphics files identified by configuration file 302 for processing.

Once processing of all of the identified vector graphics files has occurred, summary report 324 may be generated. This summary report may be created using the list created for the comparison and identifies differences that may not be visible by inspecting the merged file.

For example, art, or other graphics, can be intentionally hidden by making it the same color as the background. This art could be intelligently named allowing a runtime tool to change its color and make it visible for certain users or purposes. Another example of a difference that could not be identified by inspecting the merged files would be a polygon or circle that is filled with the background color in one version but hollow in a second version. A filled polygon can look identical to a hollow polygon, but they are encoded differently.

These differences may be identified in the summary report so that they are not missed. Summary report 324 may be created for each pair of files that are compared. Alternatively, summary report 324 may contain a summary of every pair of vector graphics files defined in configuration file 302. In this format, summary report 324 may contain an identification of the pairs of vector graphics files containing differences. Summary report 324 may be presented to a user through graphical user interface 326. In addition to reading or viewing the differences found in each vector graphics file, a user may view particular merged files in merged files database 322. In this manner, the different advantageous embodiments provide an ability to identify differences that may not be visible from a manual inspection of drawings by a user.

Through graphical user interface 326, a user may view a file in different layers in a merged file. For example, one layer may contain the drawing for the first vector graphics file, while a second layer contains a drawing for the second vector graphics file. A user may view either layer individually or both layers overlaid on top of each other. Further, the user also may select which layer is viewed on top of the other layer through graphical user interface 326.

In addition, graphical user interface 326 may be used to view a third layer in which only differences between the first vector graphics file and the second vector graphics file are displayed. Additionally, each of the layers may be displayed in a different color. This type of display may be specified through configuration file 302. Alternatively, the user may select options through graphical user interface 324 to specify how the different layers are presented. In this manner, a user may view summary report 326 and merged files in merged files database 322 to identify the difference between pairs of vector graphics files.

These and other features, in the different advantageous embodiments, allow for a quicker identification of differences between drawings. Further, the different embodiments provide a summary that allows for differences to be identified that cannot be made through a comparison of the drawings by a user.

Figure 4:
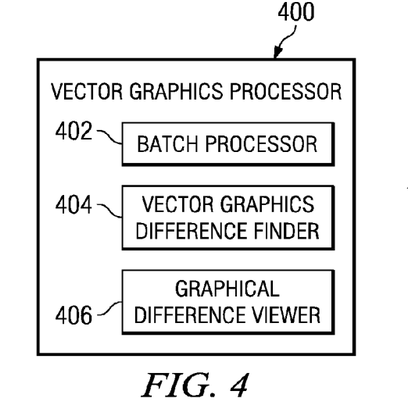
FIG. 4 is a diagram of a vector graphics processor in accordance with an advantageous embodiment.

Turning now to FIG. 4, a diagram of a vector graphics processor is depicted in accordance with an advantageous embodiment. In this example, vector graphics processor 400 includes batch processor 402, vector graphics difference finder 404, and graphical difference viewer 406. Vector graphics processor 400 is a more detailed example of vector graphics processor 300 in FIG. 3.

In this example, batch processor 402 is the functional component that parses a configuration file, such as configuration file 302 in FIG. 3. Batch processor 402 receives user input identifying the configuration file for use by vector graphics processor 400. Batch processor 402 verifies that the configuration file is valid. This validation process may include, for example, determining whether the vector graphics file specified in the configuration file exists. Further, if the configuration file identifies the location of rules rather than including rules within the configuration file, batch processor 402 also verifies that the specified set of rules can be found.

Once the configuration file has been identified as valid, batch processor 402 passes the configuration file to vector graphics difference finder 404 for processing. Depending on the particular implementation, batch processor 402 may pass each of the files to vector graphics difference finder 404, as needed for processing.

Vector graphics difference finder 404 performs the actual comparison of the files specified in the configuration file. In these examples, vector graphics difference finder 404 compares the graphics data in both of the vector graphics files to determine if differences are present. In comparing the graphics data, vector graphics difference finder 404 compares the primitives as found in each of the files. Each primitive in one vector graphics file is compared with the primitives in another vector graphics file to determine whether differences are present.

In comparing primitives, the actual primitive as well as attributes, such as location, color, and other parameters may be compared to determine whether differences are present. Further, certain differences may be ignored, depending on the rules set out by the configuration file. For example, the rules may indicate that font types, character height, and line width should be ignored. Other rules may include ignoring any sort of characters that are used. Further, a rule may specify that a particular portion of the vector graphics file is to be ignored.

Vector graphics difference finder 404 also may parse the headers of the two input vector graphics files to identify an appropriate header for the merged file. The header of a graphics file provides meta-information defining how elements will be encoded and various constraints on elements. This meta-information includes, for example, whether the x-y coordinates will be encoded as real or integer values, the minimum and maximum x-y values, color precision, character sets and fonts to be used. For example, two vector graphics files may have different x-y extents. In this type of situation, the merged file may require an extent that is large enough to accommodate both of the input extents. Similarly, if the files have different font lists, the merged file may need a font list containing both sets of fonts. This type of information is identified and placed into the header for the merged file.

Batch processor 402 generates a table of contents that may be, for example, a hypertext markup language file that contains a link for every pair of files that were compared that had at least one difference reported by vector graphics difference finder 404. This table of contents may be part of a summary report, such as summary report 324 in FIG. 3.

Graphical difference viewer 406 displays the table of contents, as well as any other information in the summary report. This information may include information from summary report 324 in FIG. 3.

The different processes have been shown as being grouped into three functional components for purposes of illustrating one embodiment. This configuration is not mean to limit the manner in which the advantageous embodiments may be implemented. For example, a software component can be used to implement the functions depicted in batch processor 402, vector graphics difference finder 404, and graphical difference viewer 406.

Figure 5:
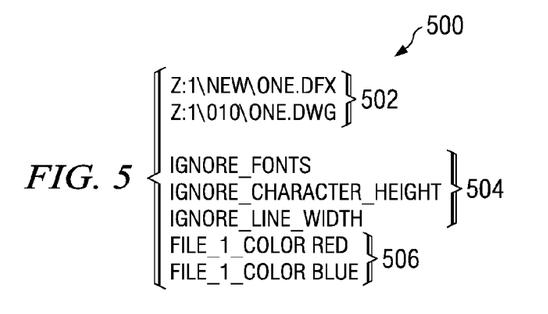
FIG. 5 is a diagram illustrating an example of a configuration file in accordance with an advantageous embodiment.

Turning now to FIG. 5, a diagram illustrating an example of a configuration file is depicted in accordance with an advantageous embodiment. Configuration file 500 is an example of a configuration file, such as configuration file 302 in FIG. 3. In this example, section 502 identifies a pair of vector graphics files for use as input files. Section 504 identifies rules for use in processing the vector graphics files. In these examples, fonts, character height, and line widths are ignored. Section 506, in configuration file 500, identifies colors for use in presenting the graphics data from the two different input files defined in section 502.

Figure 6:
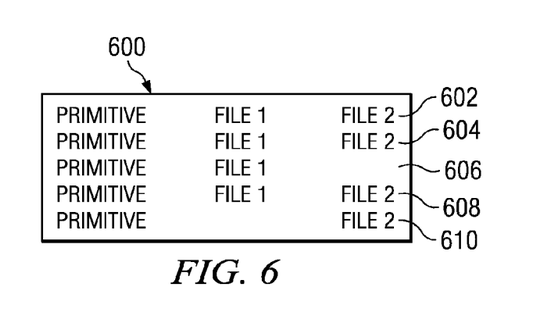
FIG. 6 is a diagram illustrating a list generated by a vector graphics processor in accordance with an advantageous embodiment.

With reference now to FIG. 6, a diagram illustrating a list generated by a vector graphics processor is depicted in accordance with an advantageous embodiment. List 600 is an example of a list that may be generated by vector graphics processor 300 in FIG. 3. In particular, list 600 may be part of summary report 324 in FIG. 3.

In this particular example, a list of primitives and vector graphics files, in which the primitives are found, is present in list 600. In this particular example, list 600 contains entries 602, 604, 606, 608, and 610. Entries 602, 604, and 608 indicate that those primitives are found in both files. As a result, a match between those primitives is present. Entry 606 indicates that the primitive is only found in file one, while entry 610 indicates that the primitive in this entry is only found in file two. Consequently, the primitives in entry 606 and 610 may be placed in the third layer identifying the differences found between the two vector graphics files.

Figure 7:
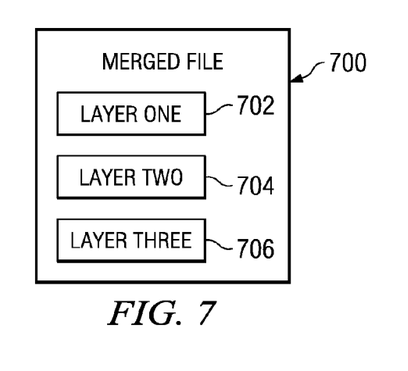
FIG. 7 is a diagram illustrating a merged file in accordance with an advantageous embodiment.

Turning now to FIG. 7, a diagram illustrating a merged file is depicted in accordance with an advantageous embodiment. Merged file 700 is an example of a merged file that may be located in merged files database 322 in FIG. 3. Merged file 700 is created by a process, such as vector graphics processor 400 in FIG. 4. In particular, vector graphics difference finder 404 in FIG. 4 may generate merged file 700. In this example, merged file 700 includes layer one 702, layer two 704, and layer three 706.

Layer one 702 and layer two 704 contain vector graphics data from two vector graphics data files that were compared by a vector graphics difference finder. More specifically, in these examples, layer one 702 contains primitives extracted from the first vector graphics data file and layer two 704 contains the primitives extracted from the second vector graphics data file. These files only contain the vector graphics data and do not contain other data, such as intelligent objects or other information, such as hyperlink objects or scripts that also may be found in the particular files being compared.

Layer three 706 contains vector graphics data identifying the differences between layer one 702 and layer two 704. The information in layer three 706 represents the difference data between the art represented by the two vector graphics data files.

Further, each of these layers may be specified or associated with a particular color for display, such that differences between the drawings may be more visible. For example, layer one 702 may be displayed on top or over layer two 704. By having different colors for each layer, differences may be more easily identified with respect to their locations in a particular drawing.

In other examples, layer two 704 may be displayed over layer one 702. In yet another example, layer three 706 may be displayed in some combination with layer one 702 and layer two 704. Further, layer three 706 may be displayed by itself to allow a user to see only the differences between the two drawings without other portions being displayed.

Figure 8:
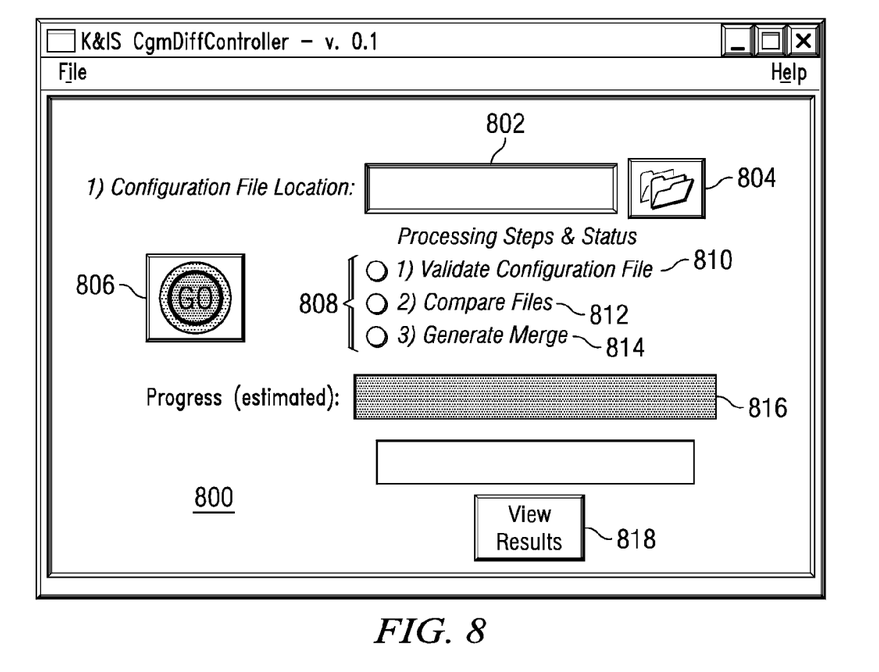
FIG. 8 is a diagram of a user interface for processing vector graphics files in accordance with an advantageous embodiment.

Turning now to FIG. 8, a diagram of a user interface for processing vector graphics files is depicted in accordance with an advantageous embodiment. In this example, window 800 is an example of a user interface that may be presented in graphical user interface 326 in FIG. 3. In this example, window 800 provides a user an ability to select a configuration file in field 802. The user may type in the location of a configuration file. Alternatively, the user may select control 804 to present a viewer to identify the location of a configuration file.

Once the configuration file has been located, the user may select control 806 to initiate processing of the configuration file. Processing and status information is displayed in section 808 in window 800. This status information may include identifying when the configuration file is validated in line 810. Line 812 may indicate when vector graphics files are being processed. Line 814 indicates when a merged file has been generated from the comparison. Progress bar 816 provides an indication of the progress in comparing files. Once the merged files have been generated, the user may select control 818 to view the results.

Figure 9:
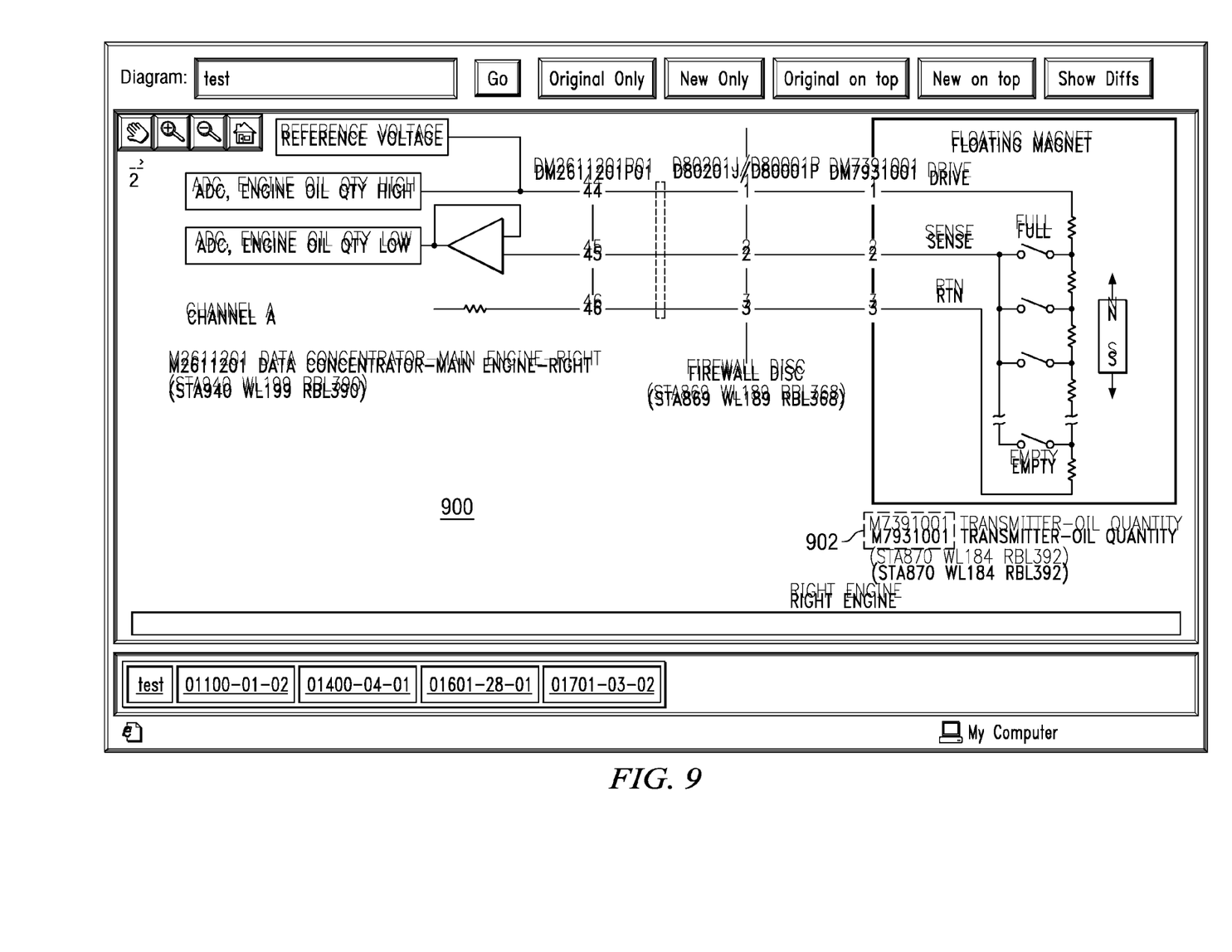
FIG. 9 is a diagram illustrating a display of layers from a merged file in accordance with an advantageous embodiment.

With reference now to FIG. 9, a diagram illustrating a display of layers from a merged file is depicted in accordance with an advantageous embodiment. In this example, window 900 is an example of a display that may be presented through a graphical user interface, such as graphical user interface 326 in FIG. 3. In particular, graphic difference viewer 406 in FIG. 4 may be used to generate graphical user interface 326 in FIG. 3 to present window 900. In this particular example, the layers are presented in window 900 with two layers, in which each layer is presented using a different color. In this example, the red layer overlays the blue layer. The configuration file has specified that character height and font differences should be ignored. There is, however, one significant difference between the two versions of the graphic. A reference designator, M7391001, in section 902, has been changed to M7931001. This difference may be very difficult to identify by visually comparing two vector files in a side by side comparison as currently performed in existing techniques. The overlaying of layers, in different colors, may help make such identifications easier by a user or operator of software, such as vector graphics processor 300 in FIG. 3.

Figure 10:
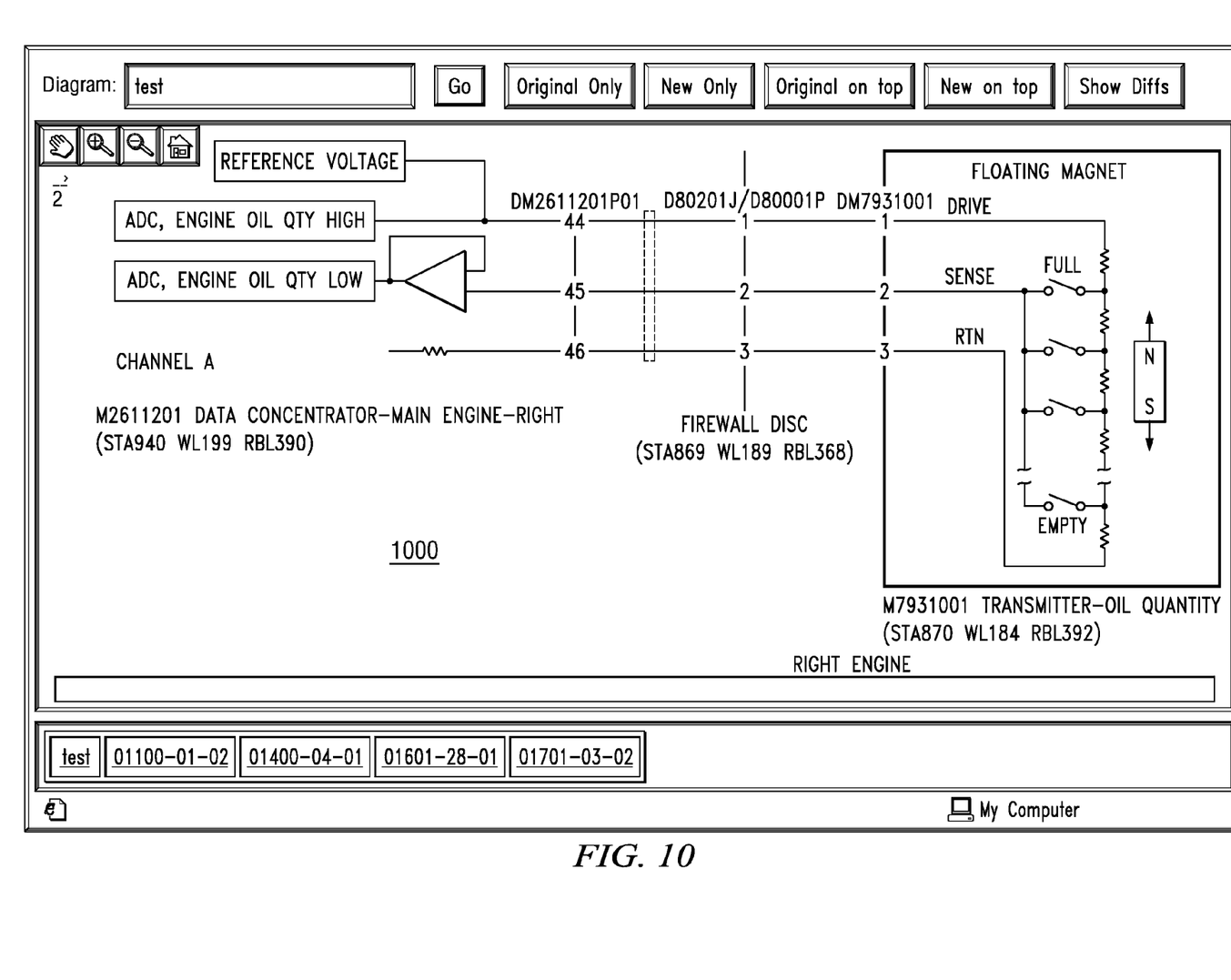
FIG. 10 is a diagram illustrating a display of layers from a merged file in accordance with an advantageous embodiment.

Turning now to FIG. 10, a diagram illustrating a display of layers from a merged file is depicted in accordance with an advantageous embodiment. Window 1000 is an example of a window that may be displayed in a graphical user interface, such as graphical user interface 326 in FIG. 3. This window may be generated in graphical user interface 326 in FIG. 3 through graphical difference viewer 406 in FIG. 4. In this particular example, only the blue layer is visible.

Figure 11:
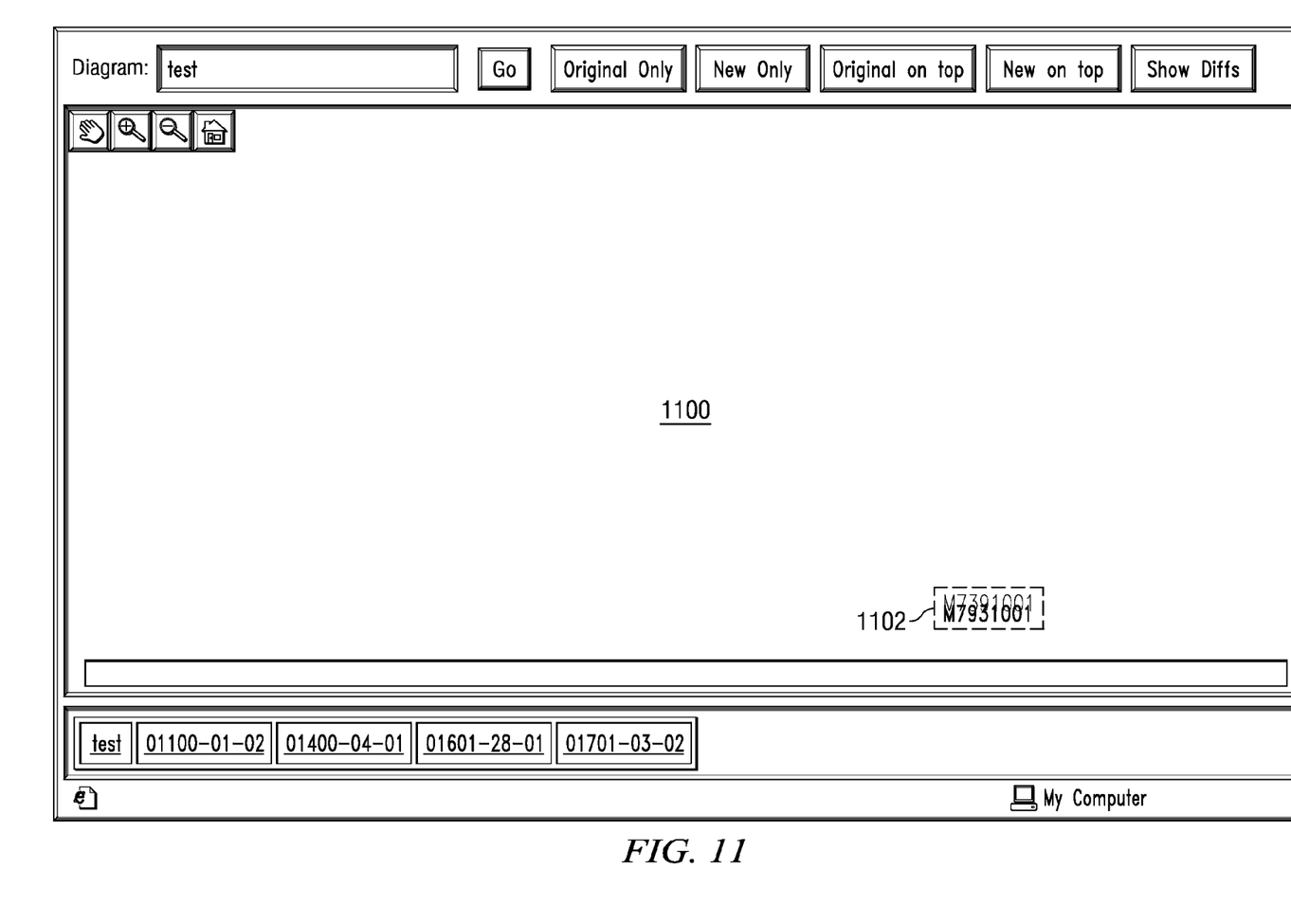
FIG. 11 is a diagram illustrating a presentation of differences between vector graphics files in accordance with an advantageous embodiment.

With reference now to FIG. 11, a diagram illustrating a presentation of differences between vector graphics files is depicted in accordance with an advantageous embodiment. In this example, window 1100 is an example of a window presented in a graphical user interface, such as graphical user interface 326 in FIG. 3. As with the other windows, this window may be generated for presentation in graphical user interface 326 in FIG. 3 using graphical difference viewer 406 in FIG. 4. Window 1100 only illustrates the differences between the two drawings illustrated in window 900 in FIG. 9.

Although the over laying of the two layers makes differences in the drawings easier to see, these differences may still be difficult to identify when large and complex drawings are involved. Further, if certain parameters, such as character height or font type, are ignored, identifying differences may still be difficult, as can be seen with reference back to window 900 in FIG. 9. To help increase the speed at which differences can be identified and to help reduce errors in comparisons, window 1100 may be presented. The difference between the two reference designators is now easy to identify.

As can be seen, the difference between the reference designator present in section 902 in window 900 in FIG. 9 is present in section 1102 of window 1100. Other portions of the drawings are not presented because differences are not present. As mentioned above, differences in character height and font types are ignored based on the settings of the configuration file, in this example.

In this example, primitives may be present from both drawings. For example, the second drawing may be missing a primitive from the first drawing. Additionally, the second drawing may include an additional primitive not found in the first drawing. Thus, if the second drawing is missing a primitive from the first drawing, the primitive from the first drawing is included in the difference layer. The additional primitive or added primitive in the second drawing may be added to the difference file.

Identification of the different drawings may be made by color coding or some other indicator. For example, a graphical or text indicator may be used to identify or associate the primitive with the vector graphics file from which the primitive originated. In the depicted example, the presentation of window 1100 allows a user to see only the differences between the two drawings without having to see other portions of the drawings, which may make viewing the differences more difficult in some situations.

Figure 12:
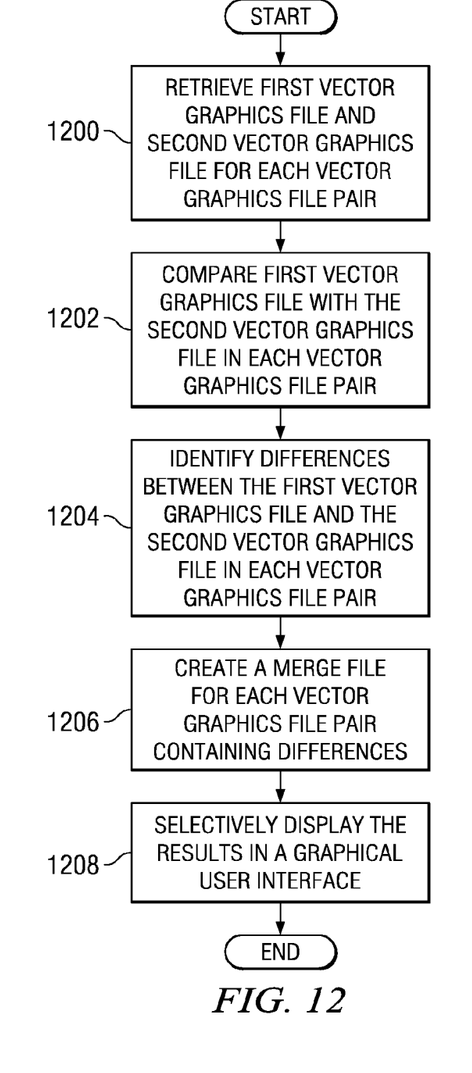
FIG. 12 is a flowchart of a process for processing vector graphics files to identify differences in accordance with an advantageous embodiment.

Turning now to FIG. 12, a flowchart of a process for processing vector graphics files to identify differences is depicted in accordance with an advantageous embodiment. The process illustrated in FIG. 12 may be implemented using a software component, such as vector graphics processor 400 in FIG. 4.

The process begins by retrieving the first vector graphics file and the second vector graphics file using the configuration file for each vector graphics file pair (operation 1200). The process compares the first vector graphics file with the second vector graphics file in each vector graphics file pair using a set of rules identified in the configuration file to form a comparison (operation 1202).

The differences between the first vector graphics file and the second vector graphics file are identified based on the comparison (operation 1204). These differences may include ones that are visually identifiable by a user as well as non-visual differences, such as, for example, without limitation, whether a polygon has a fill or no fill, and whether hidden art that may be selectively displayed is present in the drawing. In operation 1204, not every vector graphics file pair has differences. Then, a merged file is created for each vector graphics file pair containing differences (operation 1206). The process then selectively displays the results in a graphical user interface (operation 1208), with the process terminating thereafter.

Figure 13:
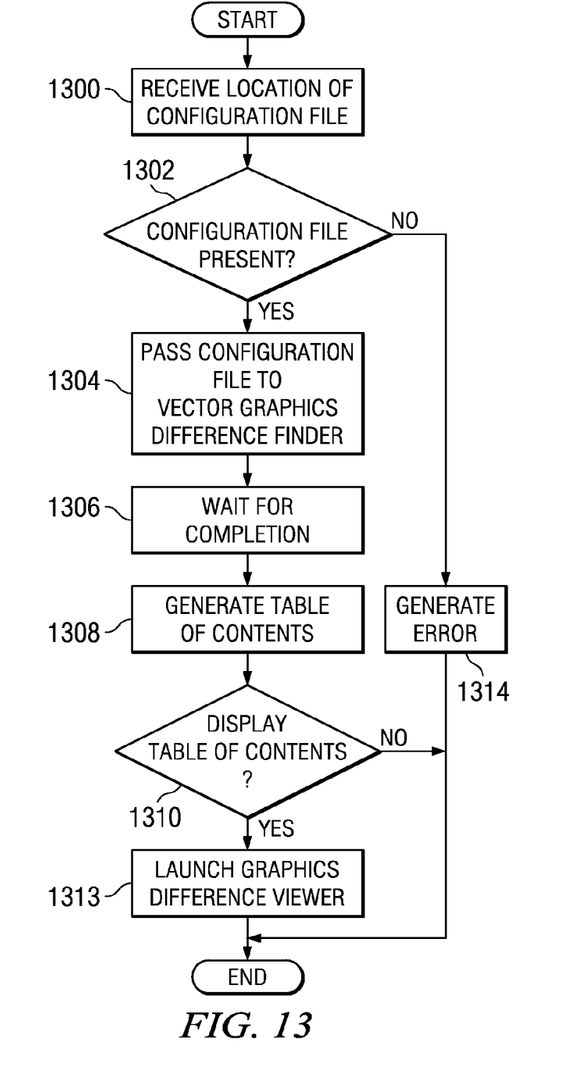
FIG. 13 is a flowchart of a process for managing comparisons of vector graphics files in accordance with an advantageous embodiment.

Turning next to FIG. 13, a flowchart of a process for managing comparisons of vector graphics files is depicted in accordance with an advantageous embodiment. The process illustrated in FIG. 13 may be implemented in a software component, such as a vector graphics process. More specifically, the illustrated process may be implemented in batch processor 402 in vector graphics processor 400 in FIG. 4.

The process begins by receiving a location of the configuration file (operation 1300). In this example, the location may be received through a user input into a graphical user interface generated by the process. Next, a determination is made as to whether the configuration file is present at the specified location (operation 1302). Operation 1302 is performed, in this example, to verify that the configuration file exists. If the configuration file is present, the process passes the configuration file to the vector graphics difference finder (operation 1304).

The process then waits for completion in processing the vector graphics file specified for comparison in the configuration file (operation 1306). This operation may involve receiving progress information from the vector graphics difference finder indicating when each pair of files has been processed.

With this information, the process may provide status information while waiting for the processing to complete. When processing of the files has completed, a table of contents is generated (operation 1308). In operation 1308, the process may generate a table of contents containing links for every pair of files compared by the vector graphics difference finder that had at least one difference. In these examples, each of these links point to the merged file for the pair of vector graphics files containing the differences. The information for this table of contents may be identified by a summary report generated by the vector graphics difference finder.

Next, a determination is made as to whether to display a table of contents (operation 1310). In operation 1310, a determination is made as to whether the user has decided to display the table of contents. This user input may be received through a window, such as window 700 in FIG. 7. If the table of contents is to be displayed, the process launches the graphics difference viewer to present the results (operation 1312), with the process terminating thereafter.

With reference again to operation 1310 if the user does not choose to display the table of contents, the process terminates. With reference back to operation 1302, if a configuration file is not present at the location, the process generates an error (operation 1314), with the process terminating thereafter.

Figure 14:
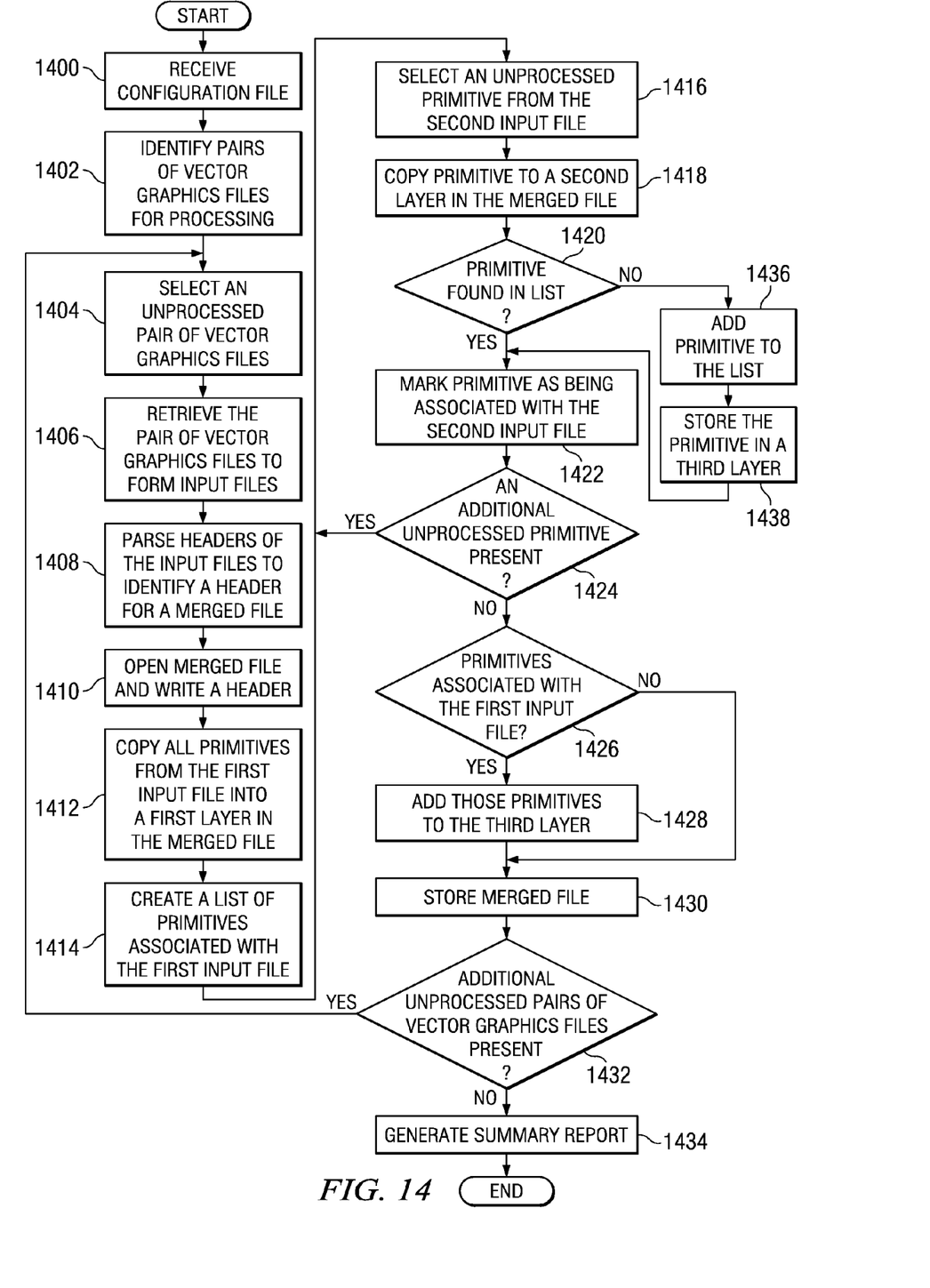
FIG. 14 is a flowchart of a process for identifying differences between drawings in vector graphics files in accordance with an advantageous embodiment.

With reference now to FIG. 14, a flowchart of a process for identifying differences between drawings in vector graphics files is depicted in accordance with an advantageous embodiment. The process illustrated in FIG. 14 may be implemented in a software component, such as vector graphics processor 400 in FIG. 4. More specifically, the process illustrated in the flowchart may be implemented in vector graphics difference finder 404 in FIG. 4.

The process begins by receiving a configuration file (operation 1400). In these examples, the configuration file is received from a software component, such as batch processor 402 in FIG. 4. The process then identifies pairs of vector graphics files for processing (operation 1402). In these examples, the pairs are identified from information in the configuration file.

Next, the process selects an unprocessed pair of vector graphics files from the identified pairs of vector graphics files for processing (operation 1404). The pair of vector graphics files is also referred to as a vector graphics file pair, in these examples. The process then retrieves the pair of vector graphics files to form input files (operation 1406).

The headers of the input files are parsed to identify the header for a merged file (operation 1408). The header for the merged file may be different because the two input files may have different parameters that require a header with parameters that encompasses both of the input files. For example, the two input files may have different x-y extents. As a result, the merged file requires an extent that accommodates both of the extents in the different input files. Further, as another example, the files may have different font lists. The merged file, in this type of example, has a font list that contains both sets of fonts.

The process then opens a merged file and writes a header for the merged file (operation 1410). The process copies all of the primitives from the first input file into a first layer in the merged file (operation 1412). The process creates a list of primitives associated with the first input file (operation 1414).

Next, the process selects an unprocessed primitive from the second input file (operation 1416). The process copies the primitive to a second layer in the merged file (operation 1418). A determination is made as to whether the primitive from the second file is found in the list (operation 1420). The determination in operation 1420 may be made with respect to rules identified in the configuration file.

For example, if the primitive is present, but a slightly different attribute, such as font size or color is different, the primitive is normally not the same and will be treated as not found on the list. If, however, the rules state that a font color is to be ignored, then this parameter is not used in the comparison.

As a result, if a corresponding primitive in the first input file differs from a primitive in the second input file by only a font color, the primitive is identified as being present in this type of implementation. If the primitive is found in the list, the process marks the primitive as being associated with the second input file (operation 1422). In this operation, the primitive is now associated with both input files.

Next, a determination is made as to whether an additional unprocessed primitive is present in the second input file (operation 1424). If an additional unprocessed primitive is present, the process returns to operation 1416 to select another primitive for processing.

Otherwise, the process determines whether any primitives are associated only with the first input file (operation 1426). If any primitives are associated with only the first input file, those primitives are added to the third layer (operation 1428). Thereafter, the merged file is stored (operation 1430).

The process determines whether additional unprocessed pairs of vector graphics files are present (operation 1432). If additional unprocessed pairs of vectors graphics files are present, the process returns to operation 1404, otherwise, the process generates a summary report using the list (operation 1434), with the process terminating thereafter.

With reference again to operation 1426, if none of the primitives on the list are associated only with the first input file, the process proceeds to operation 1430 to store the merged file as described above. With reference back to operation 1420, if the primitive in the second input file is not found on the list, the process adds the primitive to the list (operation 1336). In operation 1436, the primitive is only associated with the second input file and not the first input file.

Thereafter, the primitive is stored in a third layer in the merged file (operation 1438). The process then proceeding to operation 1422) as described above. With this process, differences that are not visible to a user, such as hidden art, also may be identified by the different embodiments because primitives are present in the file containing the hidden art, even though those primitive may not be displayed or printed all the time. Another non-limiting example of non-visible differences that may be identified is polygons with and without fill. This type of information may be placed in a summary report to identify non-visual differences from comparing primitives and attributes for the primitives between vector graphics files for two drawings.

Figure 15:
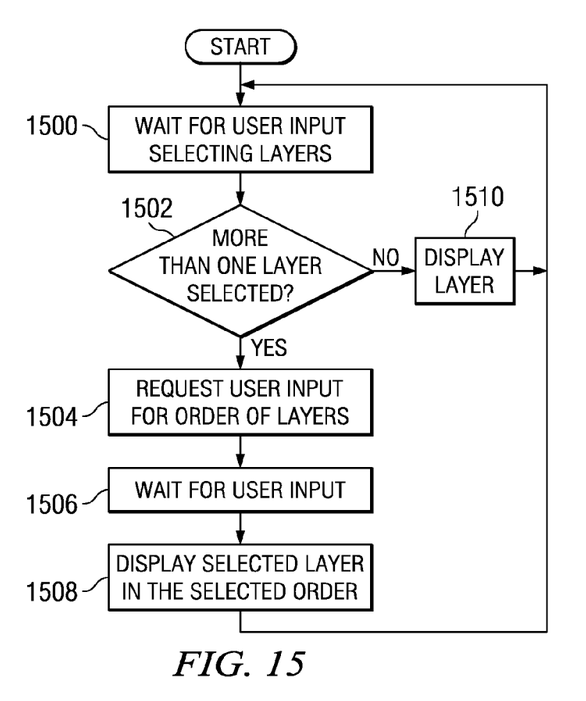
FIG. 15 is a flowchart of a process for presenting layers in a merged file in accordance with an advantageous embodiment.

With reference now to FIG. 15, a flowchart of a process for presenting layers in a merged file is depicted in accordance with an advantageous embodiment. The process illustrated in FIG. 15 may be implemented in a software component, such as vector graphics processor 400 in FIG. 4. More specifically, the process may be implemented in graphical difference viewer 406 in vector graphics processor 400 in FIG. 4. This process is used to display layers in a merged file, such as merged file 700 in FIG. 7.

The process begins by waiting for user input selecting one or more layers (operation 1500). Upon receiving the user input, the process determines whether more than one layer has been selected (operation 1502). If more than one layer has been selected, the process requests user input for an order of the layers (operation 1504).

The process then waits for user input to select the order of layers (operation 1506). When the order of layers is received, the process displays the selected layers in the selected order (operation 1508). The process then returns to operation 1500 as described above.

With reference again to operation 1502, if only a single layer has been selected, that single layer is displayed (operation 1510). The process then returns to operation 1500 as described above.

The flowcharts and block diagrams in the different depicted embodiments illustrate the architecture, functionality, and operation of some possible implementations of apparatus, methods and computer program products. In this regard, each block in the flowchart or block diagrams may represent a module, segment, or portion of computer usable or readable program code, which comprises one or more executable instructions for implementing the specified function or functions. In some alternative implementations, the function or functions noted in the block may occur out of the order noted in the figures. For example, in some cases, two blocks shown in succession may be executed substantially concurrently, or the blocks may sometimes be executed in the reverse order, depending upon the functionality involved.

Thus, the advantageous embodiments provide a computer implemented method, apparatus, and computer usable program code for identifying differences in vector graphics files. A set of vector graphics file pairs are retrieved, wherein each vector graphics file pair in the set of vector graphics file pairs includes a first vector graphics file and a second vector graphics file. The first vector graphics file is compared with the second vector graphics file in each vector graphics file pair in the set of vector graphics file pairs using a set of rules to form a set of comparisons.

Differences are identified between the first vector graphics file and the second vector graphics file in each vector graphics file pair in the set of vector graphics file pairs based on the set of comparisons. A merged file is created for each vector graphics file pair in the set of vector graphics file pairs containing differences from the set of comparisons to form results. The results are selectively displayed in a graphical user interface after creating the merged file. The different advantageous embodiments allow for both quicker and more accurate comparisons of drawings than can be performed through current inspection systems or methodologies. The different embodiments provide an ability to identify minor differences between complex drawings. Further, the different embodiments also allow for differences that are not visual to be identified.

The description of the different advantageous embodiments has been presented for purposes of illustration and description, and is not intended to be exhaustive or limited to the invention in the form disclosed. Many modifications and variations will be apparent to those of ordinary skill in the art.

The different advantageous embodiment may be applied to comparing vector graphics data for any type of drawing, not just technical drawings. Further, the different embodiments may be applied to comparing vector graphics files that have been exported, imported, or created for other reasons than creating intelligent graphics files. For example, the different embodiment may be applied to comparing a computer aided design file that has been exported for print in which only vector graphics data is present in the exported file and any other information has been removed.

The different advantageous embodiments can take the form of an entirely hardware embodiment, an entirely software embodiment or an embodiment containing both hardware and software elements. Some embodiments are implemented in software, which includes but is not limited to forms, such as, for example, firmware, resident software, and microcode.

Furthermore, the different embodiments can take the form of a computer program product accessible from a computer-usable or computer-readable medium providing program code for use by or in connection with a computer or any device or system that executes instructions. For the purposes of this disclosure, a computer-usable or computer readable medium can generally be any tangible apparatus that can contain, store, communicate, propagate, or transport the program for use by or in connection with the instruction execution system, apparatus, or device.

The computer usable or computer readable medium can be, for example, without limitation an electronic, magnetic, optical, electromagnetic, infrared, or semiconductor system, or a propagation medium. Non limiting examples of a computer-readable medium include a semiconductor or solid state memory, magnetic tape, a removable computer diskette, a random access memory (RAM), a read-only memory (ROM), a rigid magnetic disk, and an optical disk. Optical disks may include compact disk-read only memory (CD-ROM), compact disk-read/write (CD-R/W) and DVD.

Further, a computer-usable or computer-readable medium may contain or store a computer readable or usable program code such that when the computer readable or usable program code is executed on a computer, the execution of this computer readable or usable program code causes the computer to transmit another computer readable or usable program code over a communications link. This communications link may use a medium that is, for example without limitation, physical or wireless.

A data processing system suitable for storing and/or executing computer readable or computer usable program code will include one or more processors coupled directly or indirectly to memory elements through a communications fabric, such as a system bus. The memory elements may include local memory employed during actual execution of the program code, bulk storage, and cache memories which provide temporary storage of at least some computer readable or computer usable program code to reduce the number of times code may be retrieved from bulk storage during execution of the code.

Further, different advantageous embodiments may provide different advantages as compared to other advantageous embodiments. The embodiment or embodiments selected are chosen and described in order to best explain the principles of the invention, the practical application, and to enable others of ordinary skill in the art to understand the invention for various embodiments with various modifications as are suited to the particular use contemplated.

What is claimed is:

1. A computer implemented method for identifying differences in vector graphics files, the computer implemented method comprising:
    identifying by the computer a configuration file, wherein the configuration file provides a location of a first vector graphics file and a second vector graphics file and a set of rules;
    retrieving by the computer the first vector graphics file and the second vector graphics file using the location in the configuration file, wherein the first vector graphics file comprises a first plurality of primitives and the second vector graphics file comprises a second plurality of primitives;
    wherein a primitive includes at least one of a point, line, curve, or polygon;
    placing the first plurality of primitives from the first vector graphics file into a first layer in a merged file;
    placing the second plurality of primitives from the second vector graphics file into a second layer in the merged file;
    adding the first plurality of primitives to a list in association with the first vector graphics file;
    comparing by the computer the second plurality of primitives in the second vector graphics file to primitives on the list to form a comparison;
    responsive to a match between a primitive in the second plurality of primitives and a corresponding primitive on the list, marking by the computer the corresponding primitive on the list as being associated with the second vector graphics file;
    responsive to any primitive on the list being associated only with a single vector graphics file, placing by the computer the any primitive in a third layer; and
    displaying a set of layers identified from the first layer, the second layer, and the third layer in the merged file in a selected order.

2. The computer implemented method of claim 1, wherein the first vector graphics file and the second vector graphics file is a pair of vector graphics files and wherein the configuration file provides locations for additional pairs of vector graphic files for identifying differences.

3. The computer implemented method of claim 1 further comprising:
    creating a summary report from the list, wherein the summary report identifies primitives not found in both the first vector graphics file and the second vector graphics file.

4. The computer implemented method of claim 3, wherein the summary report comprises an identification of differences between the first vector graphics file and the second vector graphics file that are not visually apparent from a display of the set of layers.

5. The computer implemented method of claim 1, wherein the displaying step further comprises:
    changing the set of layers displayed in response to a user input.

6. The method of claim 1 where a primitive includes an attribute of a primitive selected from the group consisting of line width, color, font size, spacing, and location.

7. A computer implemented method for identifying differences in vector graphics files, the computer implemented method comprising: retrieving, by the computer, a set of vector graphics file pairs, wherein each vector graphics file pair in the set of vector graphics file pairs includes a first vector graphics file and a second vector graphics file; comparing, by the computer, the first vector graphics file with the second vector graphics file in each vector graphics file pair in the set of vector graphics file pairs using a set of rules to form a set of comparisons; identifying, by the computer, differences between the first vector graphics file and the second vector graphics file in each vector graphics file pair in the set of vector graphics file pairs based on the set of comparisons; creating, by the computer, a merged file for each vector graphics file pair in the set of vector graphics file pairs containing differences from the set of comparisons to form results; and selectively displaying the results in a graphical user interface after creating the merged file; wherein the results comprise first primitives from the first vector graphics file stored in a first layer in the merged file, second primitives from the second vector graphics file stored in a second layer in the merged file, and third primitives for the differences stored in a third layer in the merged file.

8. The computer implemented method of claim 7 further comprising:
identifying a configuration file, wherein the configuration file provides a location for pairs of vector graphics files and a set of rules.

9. The computer implemented method of claim 7, wherein the selectively displaying step comprises:
creating a plurality of layers comprising the first layer containing a first drawing, the second layer containing a second drawing, and a third layer containing a third drawing; and
displaying a portion of the plurality of layers on the graphical user interface in response to a user input.

10. The computer implemented method of claim 9, wherein the selectively displaying step further comprises:
responsive to another user input, displaying a different portion of the plurality of layers on the graphical user interface.

11. The computer implemented method of claim 7, wherein the results further comprise a summary of the differences between the first vector graphics file and the second vector graphics file.

12. The computer implemented method of claim 7, wherein the comparing step comprises:
adding a first plurality of primitives in the first vector graphics file to a list in association with the first vector graphics file;
comparing a second plurality of primitives in the second vector graphics file to primitives on the list to form a comparison for the set of comparisons; and
responsive to a match between a primitive in the second plurality of primitives and a corresponding primitive on the list, marking the corresponding primitive on the list as being associated with the second vector graphics file.

13. A computer program product comprising:
a non-transitory computer usable medium having a computer usable program code for identifying differences in vector graphics files, the computer program product comprising:
computer usable program code for identifying a configuration file, wherein the configuration file provides a location of a first vector graphics file and a second vector graphics file and a set of rules;
computer usable program code for retrieving the first vector graphics file and the second vector graphics file using the location in the configuration file, wherein the first vector graphics file comprises a first plurality of primitives and the second vector graphics file comprises a second plurality of primitives;
wherein a primitive comprises a point, line, curve, or polygon;
computer usable program code for placing the first plurality of primitives from the first vector graphics file into a first layer in a merged file;
computer usable program code for placing the second plurality of primitives from the second vector graphics file into a second layer in the merged file;
computer usable program code for adding the first plurality of primitives to a list in association with the first vector graphics file;
computer usable program code for comparing the second plurality of primitives in the second vector graphics file to primitives on the list to form a comparison;
computer usable program code, responsive to a match between a primitive in the second plurality of primitives and a corresponding primitive on the list, marking the corresponding primitive on the list as being associated with the second vector graphics file;
computer usable program code, responsive to any primitive on the list being associated only with a single vector graphics file, for placing the any primitive in a third layer; and
computer usable program code for displaying a set of layers identified from the first layer, the second layer, and the third layer in the merged file in a selected order.

14. The computer program product of claim 13, wherein the first vector graphics file and the second vector graphics file is a pair of vector graphics files and wherein the configuration file provides locations for additional pairs of vector graphic files for identifying differences.

15. The computer program product of claim 13 further comprising:
computer usable program code for creating a summary report from the list, wherein the summary report identifies primitives not found in both the first vector graphics file and the second vector graphics file.

16. The computer program product of claim 13, wherein the computer usable program code for displaying the set of layers identified from the first layer, the second layer, and the third layer in the merged file in the selected order further comprises:
computer usable program code for changing the set of layers displayed in response to a user input.

17. A data processing system comprising:
a bus;
a communications unit connected to the bus;
a storage device connected to the bus, wherein the storage device includes computer usable program code; and
a processor unit connected to the bus, wherein the processor unit executes the computer usable program to identify a configuration file, wherein the configuration file provides a location of a first vector graphics file and a second vector graphics file and a set of rules; retrieve the first vector graphics file and the second vector graphics file using the location in the configuration file, wherein the first vector graphics file comprises a first plurality of primitives and the second vector graphics file comprises a second plurality of primitives; place the first plurality of primitives from the first vector graphics file into a first layer in a merged file; place the second plurality of primitives from the second vector graphics file into a second layer in the merged file; add the first plurality of primitives to a list in association with the first vector graphics file; compare the second plurality of primitives in the second vector graphics file to primitives on the list to form a comparison; mark a corresponding primitive on the list as being associated with the second vector graphics file in response to a match between a primitive in the second plurality of primitives the corresponding primitive on the list; place the any primitive in a third layer in response to any primitive on the list being associated only with a single vector graphics file; display a set of layers identified from the first layer, the second layer, and the third layer in the merged file in a selected order; and create a summary report from the list, wherein the summary report identifies primitives not found in both the first vector graphics file and the second vector graphics file.

18. The data processing system of claim 17, wherein the first vector graphics file and the second vector graphics file is a pair of vector graphics files and wherein the configuration file provides locations for additional pairs of vector graphic files for identifying differences.

19. The data processing system of claim 17, wherein in executing the computer usable program code to display the set of layers identified from the first layer, the second layer, and the third layer in the merged file in the selected order, the processor unit further executes the computer usable program code to change the set of layers displayed in response to a user input.

* * * * *